US008920537B2

(12) United States Patent
Seike

(10) Patent No.: US 8,920,537 B2
(45) Date of Patent: Dec. 30, 2014

(54) FLYING AIR PURIFIER

(75) Inventor: Aya Seike, Tokyo (JP)

(73) Assignee: Empire Technology Development LLC, Wilmington, DE (US)

( * ) Notice: Subject to any disclaimer, the term of this patent is extended or adjusted under 35 U.S.C. 154(b) by 563 days.

(21) Appl. No.: 13/148,174

(22) PCT Filed: Apr. 8, 2011

(86) PCT No.: PCT/US2011/031771
§ 371 (c)(1),
(2), (4) Date: Aug. 5, 2011

(87) PCT Pub. No.: WO2012/138350
PCT Pub. Date: Oct. 11, 2012

(65) Prior Publication Data

US 2012/0255439 A1 Oct. 11, 2012

(51) Int. Cl.
*B01D 46/00* (2006.01)
*B03C 3/017* (2006.01)

(52) U.S. Cl.
CPC ............. *B03C 3/017* (2013.01); *B03C 2201/24* (2013.01)
USPC .................. 95/3; 55/385.3; 244/30; 244/127; 244/116; 244/96; 95/8; 95/57; 96/15; 96/417

(58) Field of Classification Search
USPC .......... 55/385.1, 385.2; 244/128, 30, 125, 32, 244/33, 58, 59, 60, 96, 116, 126, 127; 446/33, 225; 136/292; 320/DIG. 33; 60/202, 204; 313/359.1, 362.1
See application file for complete search history.

(56) References Cited

U.S. PATENT DOCUMENTS

| | | | | |
|---|---|---|---|---|
| 4,236,234 | A * | 11/1980 | McDavid et al. | 367/77 |
| 5,147,429 | A * | 9/1992 | Bartholomew et al. | 55/356 |
| 5,383,627 | A | 1/1995 | Bundo | |
| 5,435,817 | A | 7/1995 | Davis et al. | |
| 6,899,745 | B2 | 5/2005 | Gatchell et al. | |
| 7,332,890 | B2 | 2/2008 | Cohen et al. | |
| 7,570,167 | B2 | 8/2009 | Fein et al. | |

(Continued)

FOREIGN PATENT DOCUMENTS

| | | |
|---|---|---|
| JP | H05-050990 A | 3/1993 |
| JP | H07-088397 A | 4/1995 |

(Continued)

OTHER PUBLICATIONS

"IRobot, IRobot Hone Cleaning Robots: Vacuuming, Floor Washing, Pool Cleaning, . . . ," IRobot Corporation, http://store.irobot.com/home/index.jsp, Jul. 2011.

(Continued)

*Primary Examiner* — Duane Smith
*Assistant Examiner* — Minh-Chau Pham
(74) *Attorney, Agent, or Firm* — Foley & Lardner LLP

(57) ABSTRACT

A flying air purifier includes a flying unit configured to fly within a space at a first elevation. The flying unit is also configured to fly within the space at a second elevation. The flying air purifier also includes an air purifier mounted to the flying unit and configured to remove particles from air within the space at the first elevation and at the second elevation. The air purifier includes an air inlet having a first charge and an air outlet having a second charge, wherein the second charge is opposite of the first charge.

20 Claims, 7 Drawing Sheets

(56) References Cited

U.S. PATENT DOCUMENTS

| | | | | |
|---|---|---|---|---|
| 7,837,134 | B2 | 11/2010 | Akisada et al. | |
| 7,997,532 | B2 * | 8/2011 | Tillotson | 244/127 |
| 8,006,933 | B2 * | 8/2011 | Tillotson | 244/127 |
| 8,112,982 | B2 * | 2/2012 | Metcalfe, Iii et al. | 60/204 |
| 8,544,797 | B2 * | 10/2013 | Kramer | 244/128 |
| 2005/0022331 | A1 | 2/2005 | Kim et al. | |
| 2006/0059872 | A1 | 3/2006 | Lee et al. | |
| 2009/0114767 | A1 | 5/2009 | Alavi | |
| 2010/0135863 | A1 | 6/2010 | Panculescu | |

FOREIGN PATENT DOCUMENTS

| | | | |
|---|---|---|---|
| JP | 2000-516039 | T | 11/2000 |
| JP | 2004-249954 | A | 9/2004 |
| JP | 2008-183543 | A | 8/2008 |
| WO | WO-03/004352 | A1 | 1/2003 |
| WO | WO 2007/003206 | A1 | 1/2007 |

OTHER PUBLICATIONS

International Search Report and Written Opinion for PCT Application No. PCT/US2011/031771, Issued Jun. 9, 2011.

"Plastic," http://en.wikipedia.orq/wiki/Plastic, Jul. 14, 2011.

Blog Entry in Japanese, showing a wire frame structure with thick paper and foil, http://blog.goo.ne.jp/flappingwing/e/79159d0c00ed2eb51de4d7acb1961f5c?st=1, Jul. 14, 2011.

"Robotics, "http://en.wikipedia.org/wiki/Robotics#Actuation, Jul. 14, 2011.

"Sky Runner, A Step-by Step Guide for Converting the Electric Free Flight Model to R.C Using the RFFS100 Module," http://www.gregcovey.com/sky_runner.htm, Greg Covey Web Hanger, Jul. 14, 2011.

YouTube Video illustrating a steady state flying unit, http://www.youtube.com/user/adshopsankyo, iadshop sankyo ラジ飛ン船コ行adshopsankyo's Channel, May, 11, 2011.

iRobot Plans to Potty Train Roomba! Patent Filing Shows Designs for Roomba Self-cleaning Dock . . . , http://robotstocknews.blogspot.com/2009_05_01_archive.html, Robot Stock News, Full Coverage of iRobot Roomba, Scooba, PackBot and Neato Robotics, May 31, 2009.

* cited by examiner

FLYING AIR PURIFIER

CROSS-REFERENCE TO RELATED APPLICATIONS

The present application is a U.S. national stage application under 35 USC section 371 claiming the benefit of International Application No. PCT/US2011/031771, filed on Apr. 8, 2011, the entire contents of which are incorporated herein by reference in its entirety.

BACKGROUND

Conventional air cleaners are stationary and purify only the air in the immediate area surrounding the air cleaner. These cleaners work by suctioning air from the localized area surrounding the cleaners. Particles that are not within the localized area are not removed from the air. As conventional air cleaners are stationary and only clean air in a local area, these air cleaners are unable to clean the air in an entire room and are unsuitable for large areas or rooms with high ceilings.

SUMMARY

An illustrative flying air purifier comprises a flying unit configured to fly within a space at a first elevation. The flying unit is also configured to fly within the space at a second elevation. The flying air purifier also includes an air purifier mounted to the flying unit that is configured to remove particles from air within the space at the first elevation and at the second elevation. The air purifier also includes an air inlet having a first charge and an air outlet having a second charge, wherein the second charge is opposite of the first charge.

An illustrative process includes flying a flying unit at a first elevation and removing particles from air at the first elevation using an air purifier mounted to the flying unit. The air purifier has an air inlet having a first charge and an air outlet having a second charge, wherein the second charge is opposite of the first charge. The flying unit moves from the first elevation to a second elevation. The flying unit flies at the second elevation and removes particles from air at the second elevation using the air purifier.

An illustrative system includes a flying unit configured to operate at a plurality of elevations within a space. The flying unit includes a balloon configured to contain a gas such that the flying unit is able to fly, a first side wing and a second side wing mounted to opposite sides of the balloon, and a tail wing mounted to the balloon. The system also includes an air purifier mounted to the flying unit and comprising an air inlet having a first charge, wherein the air inlet is configured to collect particles having a second charge. In addition, the air purifier includes an air outlet having the second charge, wherein the air outlet is configured to collect particles having the first charge, and a grid that covers the air outlet, wherein the gird also has the second charge. The illustrative system also includes a base station that is configured to dock the flying unit.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1A:
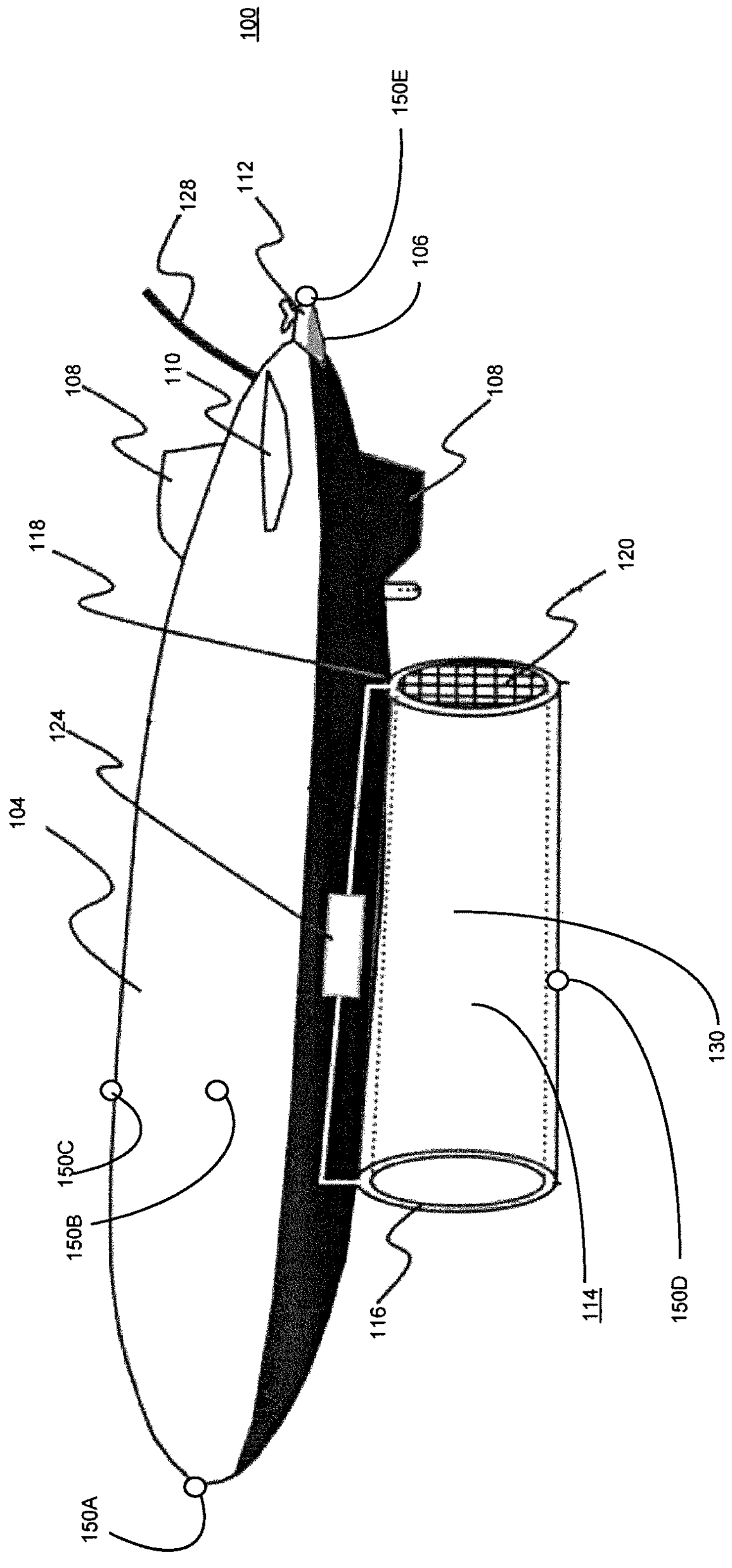
FIG. 1A is a perspective view of an illustrative embodiment of a flying air purifier.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

FIG. 1A is a perspective view of an illustrative embodiment of a flying air purifier 100. The flying air purifier 100 includes a flying unit 102. In one embodiment, the flying unit 102 includes a balloon 104 that provides lift to the flying unit 102 and a propeller 106 to generate thrust. The flying unit 102 can include other elements that generate thrust in addition to or alternative to the propeller 106. Non-limiting examples of such elements include, but are not limited to, air screws, flap wings, one or more rotary wings with tilting rotary axes, jet packs, etc.

In one illustrative embodiment, the flying unit 102 may be tethered to a base station 200 (illustrated in FIGS. 2A and 2B), and the tether may be used to control movement of the flying unit 102. In such an embodiment, the tether can be implemented via a rope, wire, cable, etc. A winch or other control mechanism at the base station 200 controls the elevation and/or reach of the flying unit 102 by reeling in or releasing a portion of the tether. Any type of winch known to those of skill in the art may be used. The winch can also control the horizontal movement of the flying air purifier 100 by movement of the tether. For instance, the winch can move the tether or the winch itself can move, which can cause the flying air purifier 100 to move in response. Using the winch to control the elevation of the flying unit 102 has the benefit of minimally disturbing dust within a navigated area. In one embodiment, at least one thrust generating element can be used in conjunction with the tether and winch to control movement of the flying air purifier 100.

The balloon 104 is configured to be filled with a gas that provides buoyancy to the flying air purifier 100. As an illustrative example, the balloon 104 can be filled with helium. Any other gas that is less dense than air can also be used to provide lift for the flying air purifier 100. The balloon 104 can be made of materials including, but not limited to, metalized polyester, metallic foil, latex, rubber, etc. In one embodiment, the balloon 104 is configured to be replaceable. In such an embodiment, the balloon 104 can be replaced after a certain number of uses. The balloon 104 also includes a gas valve 126 that allows gas to enter or exit the balloon 104. In one embodiment, the gas valve 126 can be controlled to lower the altitude of the balloon 104. According to one embodiment, an orbit calculation unit 220, described in detail below, controls the elevation of the balloon 104 by manipulation of the gas value 126. In an alternative embodiment in which the balloon 104 is tethered, the altitude of the balloon 104 can be controlled by a winch or other control mechanism as described above.

Figure 1B:
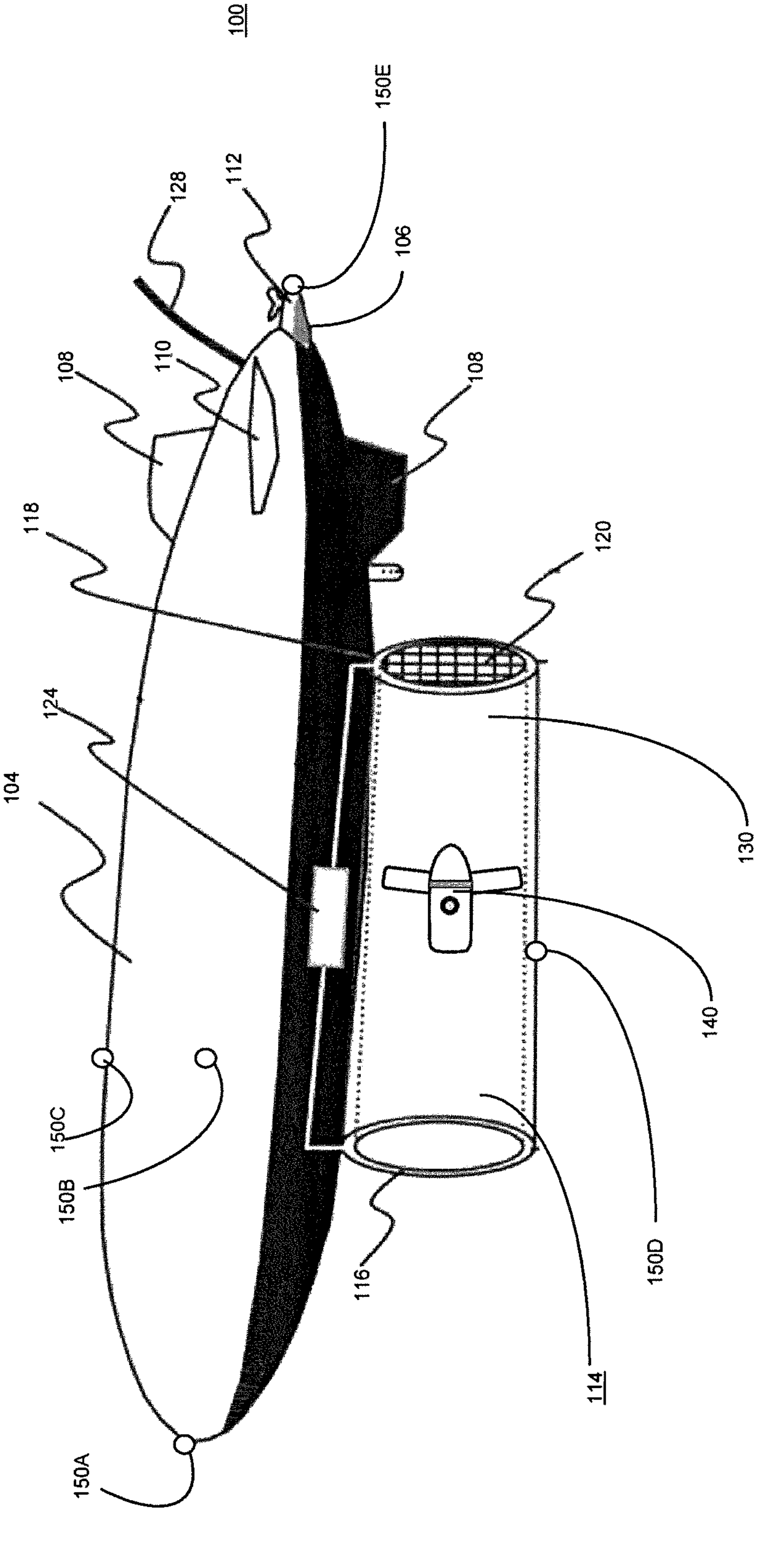
FIG. 1B is a perspective view of another illustrative embodiment of a flying air purifier.

FIG. 1B is a perspective view of another illustrative embodiment of a flying air purifier 100. In this embodiment, the balloon 104 is filled with a gas such that the balloon 104 is in a steady state. That is, the balloon 104 is buoyant enough to neither descend nor ascend. A thrust generating element can be used to move the balloon 104 in all directions. An air screw 140 is one example that can provide the thrust, and can be used to control both the vertical movement (e.g., elevation) and horizontal movement of the flying air purifier 100. In one embodiment a single air screw may be used, yet in other embodiments multiple air screws can be used. As a non-limiting example, a pair of air screws can be used, affixed to the sides of an air purifier 114, which is described in more detail below. In one embodiment, the air screw 140 can rotate such that the air screw 140 provides a force to move the balloon forward, backward, upward, or downward.

The flying air purifier 100 can include one or more sensors 150A-150E. In alternative embodiments, additional or fewer sensors may be used. The sensors 150A-150E can be used to determine when the flying air purifier 100 encounters or is about to encounter an obstacle, such as a wall, a ceiling, furniture, a person, a light fixture, etc. In one embodiment, the sensors 150A-150E can be light sensors that detect a change in light. In an alternative embodiment, the sensors 150A-150E can be, but are not limited to, pressure sensors and/or radio frequency sensors that can detect when the flying air purifier 100 comes into contact with or near an obstacle. The flying air purifier 100 can include various different sensors to detect obstacles as known to those of skill in the art.

In one embodiment, two tail wings 108 are controllable to provide lateral movement of the flying air purifier 100. The tail wings 108 can be made of materials including, but not limited to, polyvinyl chloride, polypropylene, polystyrene, polyethylene, acrylonitrile butadiene styrene, polymethyl methacrylate, etc. In one embodiment, the tail wings 108 can be made of paper or foil that is molded or otherwise attached to a wire or wooden frame. The paper or foil can be attached to the wire or wooden frame using any method(s) known to those of skill in the art. A pair of side wings 110 are controllable to provide vertical movement. A control unit 112 includes an actuator that can change the direction of the tail wings 108 and the side wings 110. In an illustrative embodiment, the control unit 112 can adjust the tail wings 108 and/or side wings 110 using an actuator. An orbit calculation unit 220, which is illustrated with reference to FIGS. 2A and 2B, can send signals to the control unit 112 to change the position of the tail wings 108 and/or side wings 110 using one or more actuators, and thus, the position of the flying air purifier 100. Actuators that can be used include, but are not limited to, magnet actuators, mechanical actuators, or piezoelectric actuators. In other embodiments, the flying air purifier 100 can include tail wings 108 and side wings 110 that do not move. While, in other embodiments, the flying air purifier 100 may not include the tail wings 108 and/or side wings 110.

The flying air purifier 100 also includes the air purifier 114, which is mounted to the flying unit 102. The air purifier 114 can be attached to the flying air purifier using screws, adhesives, wires, wire frames or any other means of attachment known in the art. The air purifier 114 includes an air inlet 116 and air outlet 118. In an illustrative embodiment, the air inlet 116 can have a radius of about 7 centimeters (cm) and the air outlet 118 can have a radius of about 6 cm. Other sizes of the air inlet 116 and air outlet 118 can be used, including but not limited to, about 5 cm, about 10 cm, about 15 cm, etc. In some embodiments, the air inlet 116 and the air outlet 118 can be different sizes, but in other embodiments, the air inlet 116 and the air outlet 118 can be the same size.

In an illustrative embodiment, both the air inlet 116 and the air outlet 118 can be made of metal. In one embodiment, the air inlet 116 and the air outlet 118 can both be composed of the same metal. In an alternative embodiment, the air inlet 116 can be composed of a first metal and the air outlet 118 can be composed of a second metal. Any material with sufficient electric conductivity can be used to make the air inlet 116 and the air outlet 118, such as, but not limited to, magnesium, aluminum, titanium, titanium nitride, copper, zinc, and metal alloys using various materials.

In an illustrative embodiment, both the air inlet 116 and the air outlet 118 are electrically charged. The air inlet 116 and the air outlet 118 can be charged using any method known to those of skill in the art. In the embodiment of FIG. 1A, a battery 124 can be used to provide and maintain the charge to the air inlet 116 and air outlets 118. In another illustrative embodiment, the air inlet 116 and the air outlet 118 are oppositely charged. For instance, the air inlet 116 can be positively charged and the air outlet 118 can be negatively charged. Conversely, the air inlet 116 can be negatively charged and the air outlet 118 can be positively charged. The charge of the air inlet 116 and the air outlet 118 can depend on the type of particles to be collected. Particles that can be collected by the air purifier include, but are not limited to, dust, smoke, bacteria, pollen, viruses, other fine particles, etc.

The air outlet 118 can also include a grid 120 configured to remove particles. The air inlet 116 can also include a similar grid (not shown). The grid 120 can be made of any material with sufficient electric conductivity such as, but not limited to, magnesium, aluminum, titanium, titanium nitride, copper, zinc, and metal alloys using various materials. In another embodiment, the grid 120 can be made of a plastic or other material that is covered in a metal film. The grid 120 can carry the same electrical charge as the air outlet 118. In one illustrative embodiment, a pitch of the grid 120 is larger than 0.2 millimeters. Alternatively, a smaller or larger pitch may be used. As with the air outlet 118, the charge of the grid can depend on the type of particles to be collected. In an illustrative embodiment, the grid 120 can be charged to collect the same type of particles as the air outlet 118.

In operation, air flows into the air purifier 114 through the air inlet 116. As the air passes through the charged air inlet 116, oppositely charged particles can be collected. The air then passes through an enclosure 130 and continues through the air outlet 118 and the grid 120. In an illustrative embodiment, the enclosure 130 can be made of wire frames and plastic. Alternatively, other materials may be used. In an illustrative embodiment, the volume of the enclosure 130 is 2660 $cm^3$. Alternatively, a larger or smaller volume may be used. In one embodiment, the enclosure 130 is empty. In another embodiment, the enclosure 130 can include a negatively charged water particle generator to remove odors from a space and from items such as walls, clothing, curtains, etc. that are within the space. The negatively charged water particle generator can include an electrode and a cooler connected to the electrode to condense water within an atmosphere. A high voltage can be applied between the electrode and an opposite electrode to negatively charge the condensed water. A mist of charged water particles can then be emitted from the electrode to reduce odors as known to those of skill in the art. In an alternative embodiment, the water particle generator may utilize a positive charge and/or the water particle generator may be mounted to a different portion of the flying air purifier 100. A charged water particle generator is described in U.S. Pat. No. 7,837,134, entitled "Electrostatically Atomizing Device," filed on Dec. 18, 2006.

The charged air outlet 118 and grid 120, both of which can have a charge opposite to that of the air inlet 116, collect oppositely charged particles. As such, the combination of the air inlet 116 and the air outlet 118 collects both positively and negatively charged particles from the air that passes near and/or through enclosure 130. As most particles in the air have an electric charge, the air inlet 116 and the air outlet 118 can remove most particles from the air. Using the air inlet 116 and the air outlet 118, the air purifier 114 collects particles statically, without creating exhaust or turbulence in the atmosphere. In an alternative embodiment, the air inlet 116 and the air outlet 118 can have the same charge to target particles of the opposite charge.

The flying air purifier 100 can also include an air quality detection system. Any method of detecting air quality known to those of skill in the art can be used. In an illustrative embodiment, the air quality detection system includes a sensor that detects the air quality and can report an air quality value that represents the air quality near the air purifier 100. The air quality value can be transmitted to the base station 200. The air quality value, as explained in greater detail below, can also be used in determining the flight path of the flying air purifier 100.

In an illustrative embodiment, the width and height of the balloon 104 can be about 60 centimeters (cm) and a length of the balloon can be about 100 cm. Balloons of other dimensions may also be used, such as, but not limited to, 50 cm×50 cm×75 cm; 25 cm×75 cm×25 cm; 25 cm×50 cm×100 cm; etc. The air purifier 114 can be about 20 cm in length and the radii of the air inlet 116 and the air output 118 can be about 7 cm and about 6 cm, respectively. In other embodiments, the air purifier 114 can be of different lengths, such as, but not limited to, about 10 cm, about 50 cm, about 100 cm, etc. The radii of the air inlet 116 and the radii of the air outlet 118 may be the same in an alternative embodiment. The radii of the air inlet 116 and/or the air outlet 118 may also be of different sizes, such as, but not limited to, about 5 cm, about 10 cm, about 15 cm, etc. In one embodiment, the balloon 104 can have a capacity to hold 247 grams of helium. In alternative embodiments, the balloon 104 can contain a smaller or larger amount of helium. In another alternative embodiment, a gas other than helium may be used, where the amount of gas contained within the balloon 104 depends upon the dimensions of the balloon and the density of the gas.

Figure 2A:
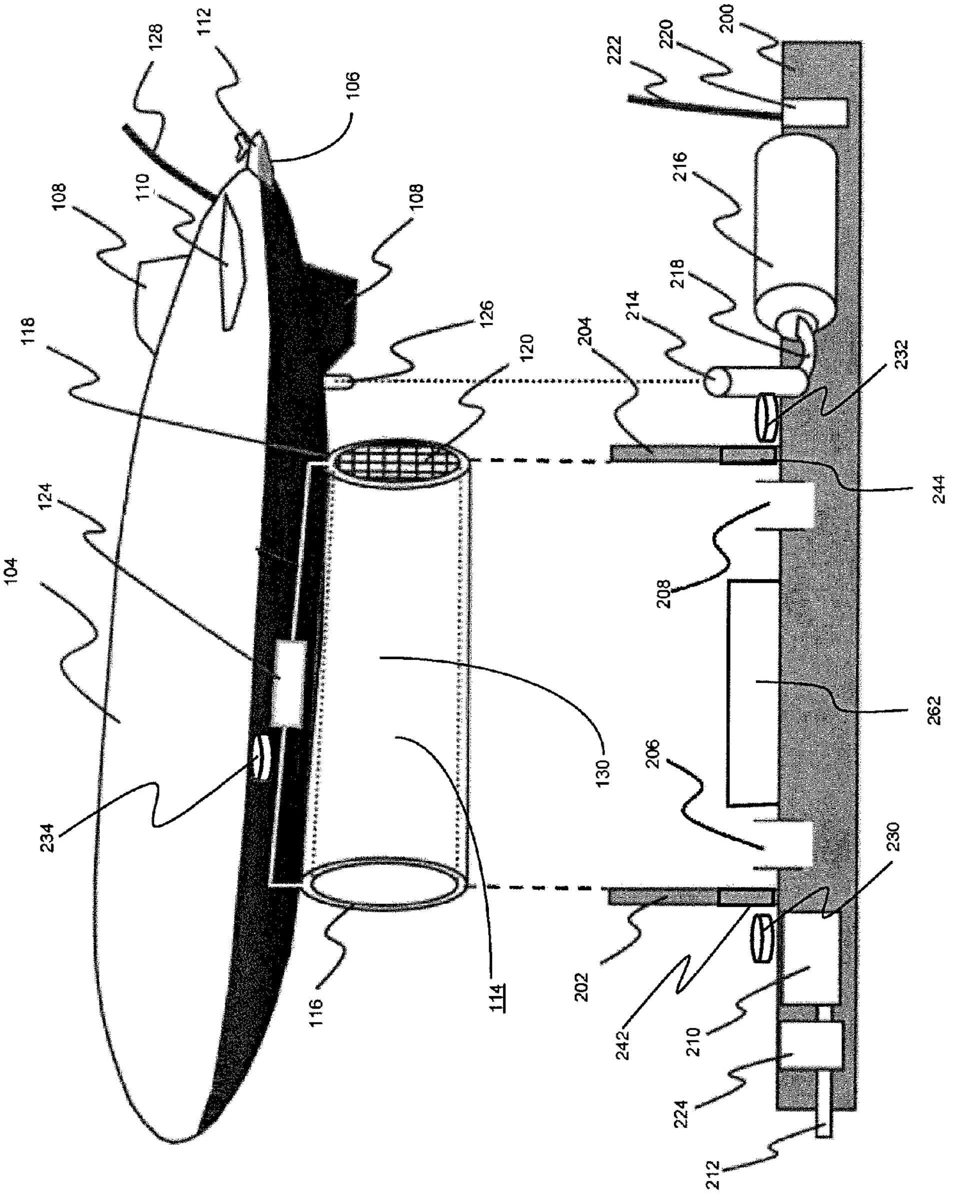
FIG. 2A is a perspective view of an illustrative embodiment of a flying air purifying system.

FIG. 2A is a perspective view of an illustrative embodiment of a flying air purifying system. The flying air purifier 100 is shown along with the base station 200. The base station 200 is configured to allow docking of the flying air purifier 100. The base station 200 also communicates with the flying air purifier 100. In one embodiment, the base station 200 includes an antenna 222 for communicating data to the flying unit 102. Data can be transmitted via the antenna 222 and received by the antenna 128 connected to the flying unit 102. The flying unit 102 can also transmit data to the base station 200 via the antenna 128. As an illustrative example, the base station 200 can be programmed to control when the flying air purifier 100 operates. For instance, the base station 200 can transmit instructions to the flying air purifier 100 to start its operation each time a space is unoccupied, at a certain time of day, according to a schedule, etc. Data can be wirelessly sent and/or received using any standard wireless communication protocol, such as, but not limited to, Wi-Fi, Bluetooth, any wireless local area network, etc. In embodiments where the flying air purifier 100 is tethered or otherwise attached to the base station 200, data can be communicated via a direct connection using wired communications as known to those of skill in the art. In such an embodiment, a communication cable can be included with the tether that connects the flying air purifier 100 to the base station 200.

In one embodiment, the base station 200 includes a docking table 262. The docking table 262 is moveable, such that the docking table 262 moves or collapses downward when the flying air purifier 100 docks. A sensor within the docking table 262 provides the base station 200 with an indication that the flying air purifier 100 is docked. In another embodiment, sensors (not shown) can be used in combination with the docking table 262 or independently to provide an indication that the flying air purifier 100 is docked. The sensors can be, but are not limited to, light sensors, pressure sensors, radio frequency sensors, and/or magnetic sensors.

The base station also includes the orbit calculation unit 220. The orbit calculation unit 220 controls the flight path of the flying air purifier 100. Flight instructions can be communicated between the orbit calculation unit 220 and the flying air purifier as described above. Flight instructions can include instructions to, but are not limited to, navigate a space, navigate to a new elevation, dock, etc. In one embodiment, the flight instructions are determined based upon a present location of the flying air purifier 100. The present location of the flying air purifier 100 can be determined any number of ways, which are more fully described below. Responsive to the flight instructions, the flying unit 102 can control the propeller 106, the air screw 140, tail wings 108, side wings 110, and/or the gas valve 126. In one embodiment, the flying air purifier 100 can be autonomous, and fly through a space based upon instructions received from the orbit calculation unit 220 prior to undocking from the base station 200. In other embodiments, the base station 200 can relay new and/or updated flight instructions to the flying air purifier 100 during flight. In one embodiment, the flying air purifier 100, based upon the flight instructions, can navigate in a circular pattern at one level of a space. Alternatively, other patterns may also be used such a square/rectangular pattern, a zig-zag pattern, an elliptical pattern, etc. If an obstacle is identified using one or more sensors 150A-150E, the flying air purifier 100 can reverse and/or change its direction by some degree, such as about 15 degrees, about 30 degrees, about 45 degrees, etc. in response to detection of the obstacle. After changing directions, the flying air purifier 100 can continue its flight through the space.

Upon completion of purifying a space, the flying air purifier 100 can return to the base station 200. There are a number of ways that the flying air purifier 100 can return to the base station 200. In one embodiment, the base station 200 may emit one or more homing signals that can be detected and used by the flying air purifier 100 to determine the location of the base station 200. In an illustrative embodiment, the base station 200 may emit a left homing signal from an emitter 230 and a right homing signal from an emitter 232. A receiver 234 on the flying air purifier 100 detects the homing signals. Upon detection, the flying air purifier 100 moves toward the base station 200 while keeping the receiver 234 between the left homing signal and right homing signal. The flying air purifier 100 continues moving toward the base station 200 until the flying air purifier 100 docks with the base station 200. In alternative embodiments, fewer or additional homing signals may be used.

In another embodiment, the flying air purifier 100 can return to the base station 200 by descending to the floor and driving to the base station. In such an embodiment, the flying air purifier 100 may include wheels (not shown) and a drive system to move the wheels. The flying air purifier 100 can descend to the floor either through the use of the air screw 140 or by releasing gas from the balloon 104 through the gas valve 126. Once the balloon reaches the ground, which can be sensed, for example, using sensor 150D, the flying air purifier 100 detects one or both of the left homing signal or the right homing signal. Upon detection of the homing signals, the flying air purifier 100 continues moving toward the base station 200, keeping the receiver 234 between the left homing signal and the right homing signal.

Figure 2B:
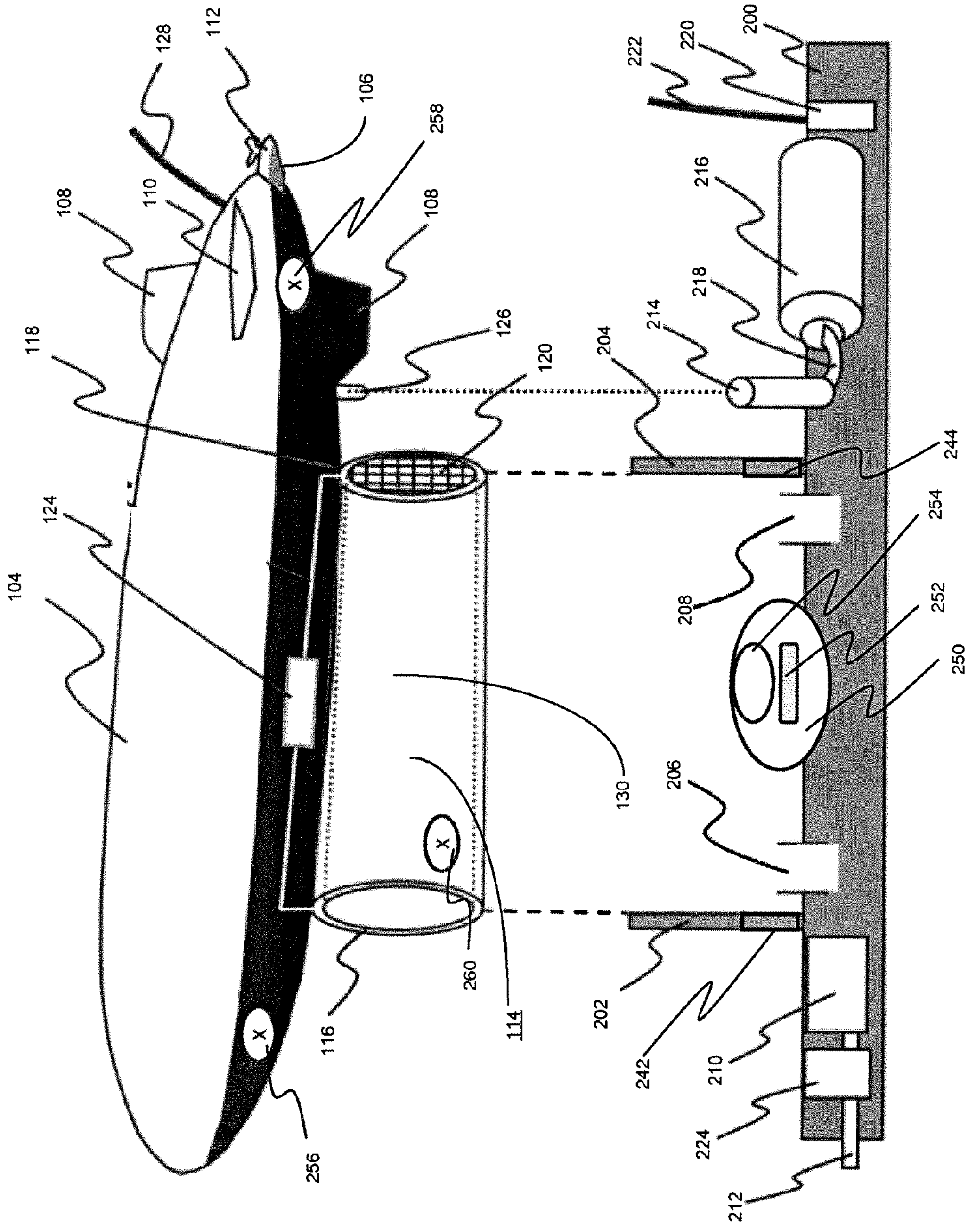
FIG. 2B is a perspective view of another illustrative embodiment of a flying air purifying system.

FIG. 2B is a perspective view of another illustrative embodiment of a flying air purifying system. In this embodiment, the base station 200 includes a camera unit 250 that includes a camera 254. In some embodiments, the camera unit 250 also includes an acceleration and/or gyroscopic sensor 252. In addition, the flying air purifier 100 can include one or more markers 256, 258, and/or 260. The markers 256, 258, and 260 may be visible to the camera unit 250 when the flying air purifier 100 is in operation. In one embodiment, the base station 200 uses triangulation to determine the location of the flying air purifier 100 and to determine the proper flight commands to send to dock the flying air purifier 100. In this embodiment, three or more markers 256, 258, and 260 are included on the flying air purifier 100. In alternative embodiments, fewer or additional markers may be used. The camera unit 250 identifies the three markers 256, 258, and 260 and triangulates the position of the flying air purifier 100 based on locations of the three markers 256, 258, and 260. The orbit calculation unit 220 can then determine the flight instructions that enable the flying air purifier 100 to dock with the base station 200. The camera unit 250 can continue to monitor the location of the flying air purifier 100 and send updated flight instructions based upon the location of the flying air purifier 100.

In yet another embodiment, the camera unit 250 can identify at least two of the markers 256, 258, and 260, and measure an angle between the two identified markers, where the angle is from the perspective of the camera unit 250. In such an embodiment, the markers 256, 258, and 260 can be uniquely identifiable, for example, by color, markings, letters, etc. The distance between the various markers 256, 258, and 260 can be known by the base station 200. In one embodiment, the camera unit 250 can move such that a first marker is in the middle of a field of view of the camera unit 250. Once the first marker is in the middle of the field of view, the camera unit 250 can determine a first orientation of the camera unit 250 relative to a predetermined orientation of the camera unit 250. In an illustrative embodiment, the orientation of the camera unit 250 can be represented via one or more angles. As an example, the first orientation of the camera unit 250 when the first marker is centered in the field of view may have a horizontal component of 15 degrees to the left (relative to the predetermined orientation) and a vertical component of 40 degrees upward (relative to the predetermined orientation). The camera unit 250 can also move such that a second marker is in the middle of the field of view, and determine a second orientation of the camera unit 250 when the second marker is centered in the field of view. Based on the first orientation and the second orientation of the camera unit 250, the base station 200 can determine an angle between the first and second markers, where the angle is from the perspective of the camera unit 250. In an alternative embodiment, the angle may be calculated from an image captured by the camera unit 250 containing at least the first and second markers, where the angle is calculated based on the known distance between markers and an orientation of the camera unit 250 at a time when the image is captured. Using the calculated angle between the first and second markers (from the perspective of the camera unit 250) and the known distances between the markers, the distance to the first and second markers of the flying air purifier 100 can be calculated as known to those of skill in the art. Once the distance to the markers is determined, the orbit calculation unit 220 can determine the flight instructions that enable the flying air purifier 100 to dock with the base station 200.

In another embodiment, the flying air purifier 100 may include a single marker, such as marker 260. The camera unit 250 can track the flying air purifier 100, and keep the single marker within a predetermined boundary of an image generated by the camera 254. In such an embodiment, the camera unit 250 can move to keep the single marker properly aligned with the camera 254. As the camera unit 250 moves, the acceleration and/or gyroscopic sensor 252 can track the movement of the camera unit 250 and therefore, can monitor the movement and/or acceleration of the flying air purifier 100. Based upon this monitoring, the acceleration and/or gyroscopic sensor 252 determines the location of the flying air purifier 100. Once the location of the flying air purifier 100 is determined, the orbit calculation unit 220 can then determine the flight instructions that enable the flying air purifier 100 to dock with the base station 200.

In one embodiment, the flying air purifier 100 docks with the base station 200 by coming within a close range of the base station 200. Magnets 242 and 244 can attract the air inlet 116 and the air outlet 118. In alternative embodiments, fewer or additional magnets may be used. The magnets 242 and 244 secure the flying air purifier 100 to the base station 200 and also help ensure that the flying air purifier 100 is properly oriented during the docking process. In one embodiment, the orbit calculation unit 220 provides the flying air purifier 100 with instructions on how to navigate toward the base station 200 close enough such that the flying air purifier 100 docks. In another embodiment in which the flying air purifier 100 is tethered, a winch can reel in the flying air purifier 100 such that the flying air purifier 100 comes within range of the magnets 242 and 244. Magnets can be used in conjunction with any of the docking embodiments described herein.

When the flying air purifier 100 is docked, the air inlet 116 is in contact with a first recharge unit 202 and the air outlet 118 is in contact with a second recharge unit 204. The recharge units 202 and 204 charge the air inlet 116 and the air outlet 118, respectively. Accordingly, the battery 124 does not have to be used to charge the air inlet 116 and the air outlet 118 when the flying air purifier 100 is docked. In addition to charging the air inlet 116 and the air outlet 118, the recharge units 202 and 204 can recharge the battery 124. For example, the air inlet 116 and air outlet 118 can be charged through direct connection with the recharge unit 202 and 204, respectively. The air inlet 116 and air outlet 118 can also be recharged using an electromagnetic field generated by the recharge units 202 and 204 and applied to the air inlet 116 and air outlet 118.

Once the flying air purifier 100 is docked, the base station 200 can control the removal of particles from the air purifier 114. The base station 200 includes a first exhaust valve 206 and a second exhaust valve 208. Both exhaust valves 206 and 208 can be coupled to a suction motor 210. To repel the collected particles, the charges applied to the air inlet 116, air outlet 118, and the grid 120 are reversed. In one embodiment, a bipolar power supply (not shown) can be used to reverse the polarity of the air 116, air outlet 118, and the grid 120. This reverse bias repels the collected particles away from the air inlet 116, air outlet 118, and the grid 120. Exhaust valves 206 and 208 collect the repelled particles using suction supplied by the suction motor 210. The removed particles can be filtered out of the air by an air filter 224. An exhaust port 212 allows the purified air to return to the atmosphere after the particles have been filtered out by the air filter 224.

The base station 200 also facilitates the recharge of the balloon 104 with the gas. The gas valve 126 on the balloon 104 allows gas to pass into or out of the balloon 104. The base station 200 has a gas refill inlet 214 which corresponds to the gas valve 126. When the flying air purifier 100 is docked at the base station 200, the gas refill inlet 214 can be coupled to the gas valve 126. A gas cylinder 216 can be connected to the gas refill inlet 214 via a tube 218. The base station 200 can control the flow of gas from the gas cylinder 216 to the balloon 104 via the gas refill inlet 214. A pressure gauge operably connected to the gas refill inlet 214 can be used to determine the pressure, and therefore, the volume of the gas within the balloon 104. In the steady state embodiments, the base station 200 determines if the balloon 104 should receive any additional gas and the amount of the gas to reach the steady state. The base station 200 can release gas from the gas cylinder 216 until the balloon 104 has the proper amount of gas, such that, the flying air purifier 100 is in the steady state. Once the balloon 104 is fully charged with gas, the base station 200 controls the gas refill inlet 214 to stop the flow of gas into the balloon 104.

In an alternative embodiment, the flying air purifier 100 may be tethered to the base station 200 via a tether that is mounted to both the flying air purifier 100 and the base station 200. In one configuration, a length of the tether can be set to control a maximum height and/or distance from the base station 200 that the flying air purifier 100 is able to reach. As such, a length of the tether can be controlled to help prevent the flying air purifier 100 from bumping into walls, ceilings, or other objects. The base station 200 can release the flying air purifier 100 by using a winch to release or reel out some or all of the tether such that the flying air purifier 100 is able to reach a particular elevation and/or area. The base station 200 can reel the tether in or out to allow the purifying of air in different elevations and/or areas. In one embodiment, the tether may also include a communication cable that connects the flying air purifier 100 and the base station 200. The communication cable can be used by the flying air purifier 100 and the base station 200 to exchange information between one another. For instance, the communication cable can be used to communicate flight instructions from the base station 200 to the flying air purifier 100. The communication path can also be used to communicate the altitude or position of the flying air purifier 100, a quality of air detected by the flying air purifier 100, a gas level of the flying air purifier 100, a battery charge level of the flying air purifier 100, etc.

Figure 3:
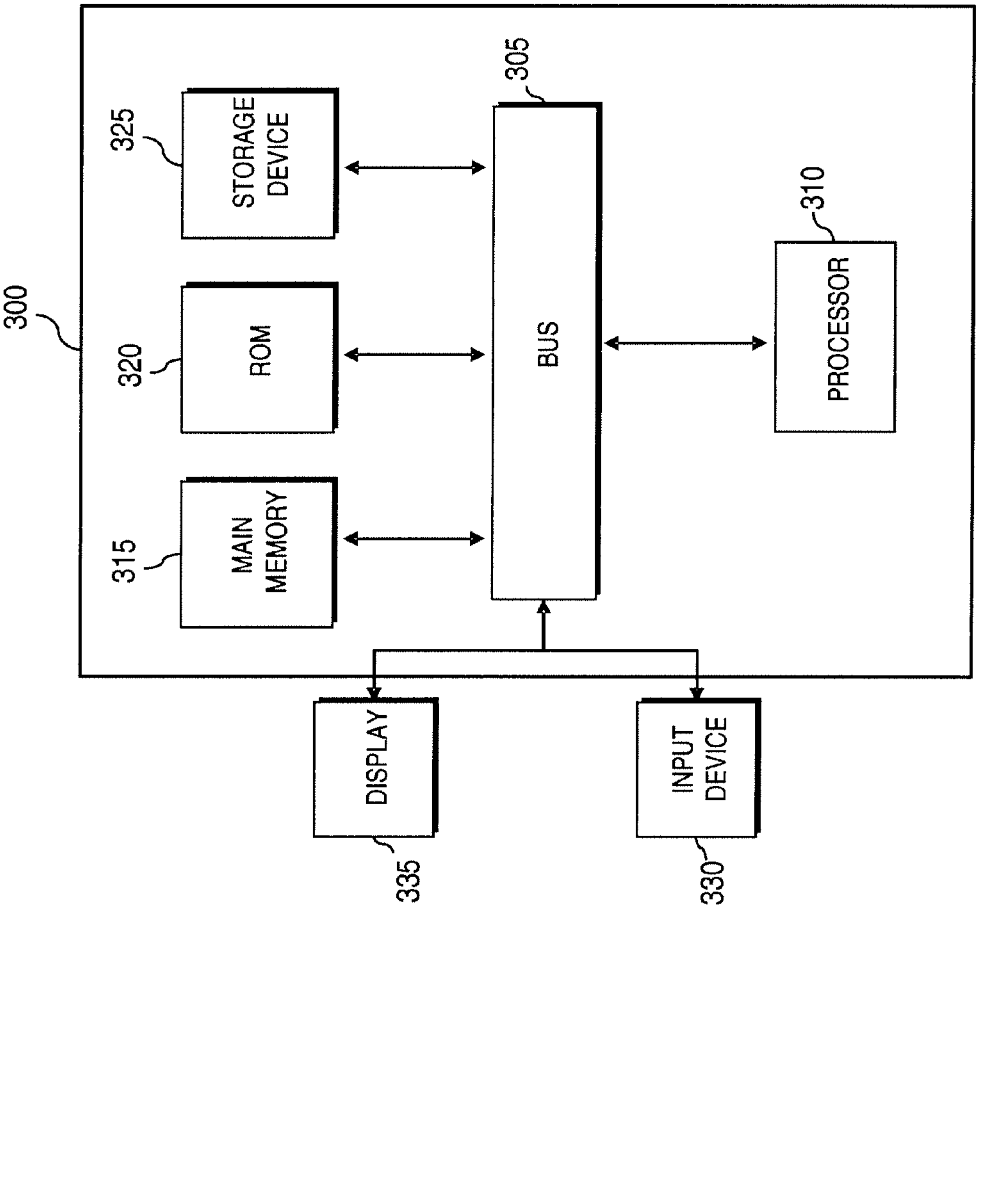
FIG. 3 is a depiction of a computer system of an orbit calculation unit in accordance with an illustrative embodiment.

FIG. 3 illustrates a depiction of a computer system 300 representing an illustrative orbit calculation unit 220. The computing system 300 includes a bus 305 or other communication mechanism for communicating information and a processor 310 coupled to the bus 305 for processing information. The computing system 300 also includes main memory 315, such as a random access memory (RAM) or other dynamic storage device, coupled to the bus 305 for storing flight instructions, information, and instructions to be executed by the processor 310. Main memory 315 can also be used for storing position information, temporary variables, or other intermediate information during execution of instructions by the processor 310. The computing system 300 may further include a read only memory (ROM) 310 or other static storage device coupled to the bus 305 for storing static information and instructions for the processor 310. The flight instructions may also be stored in the ROM 310. A storage device 325, such as a solid state device, magnetic disk or optical disk, is coupled to the bus 305 for persistently storing information and instructions.

The computing system 300 may be coupled via the bus 305 to a display 335, such as a liquid crystal display, or active matrix display, for displaying information to a user. An input device 330, such as a keyboard including alphanumeric and other keys, may be coupled to the bus 305 for communicating flight instructions, information, and command selections to the processor 310. In another embodiment, the input device 330 has a touch screen display 335. The input device 330 can include a cursor control, such as a mouse, a trackball, or cursor direction keys, for communicating direction information and command selections to the processor 310 and for controlling cursor movement on the display 335.

According to various embodiments, the processes that effectuate illustrative embodiments that are described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. In alternative embodiments, hard-wired circuitry may be used in place of or in combination with software instructions to implement illustrative embodiments. Thus, embodiments are not limited to any specific combination of hardware circuitry and software.

Figure 4:
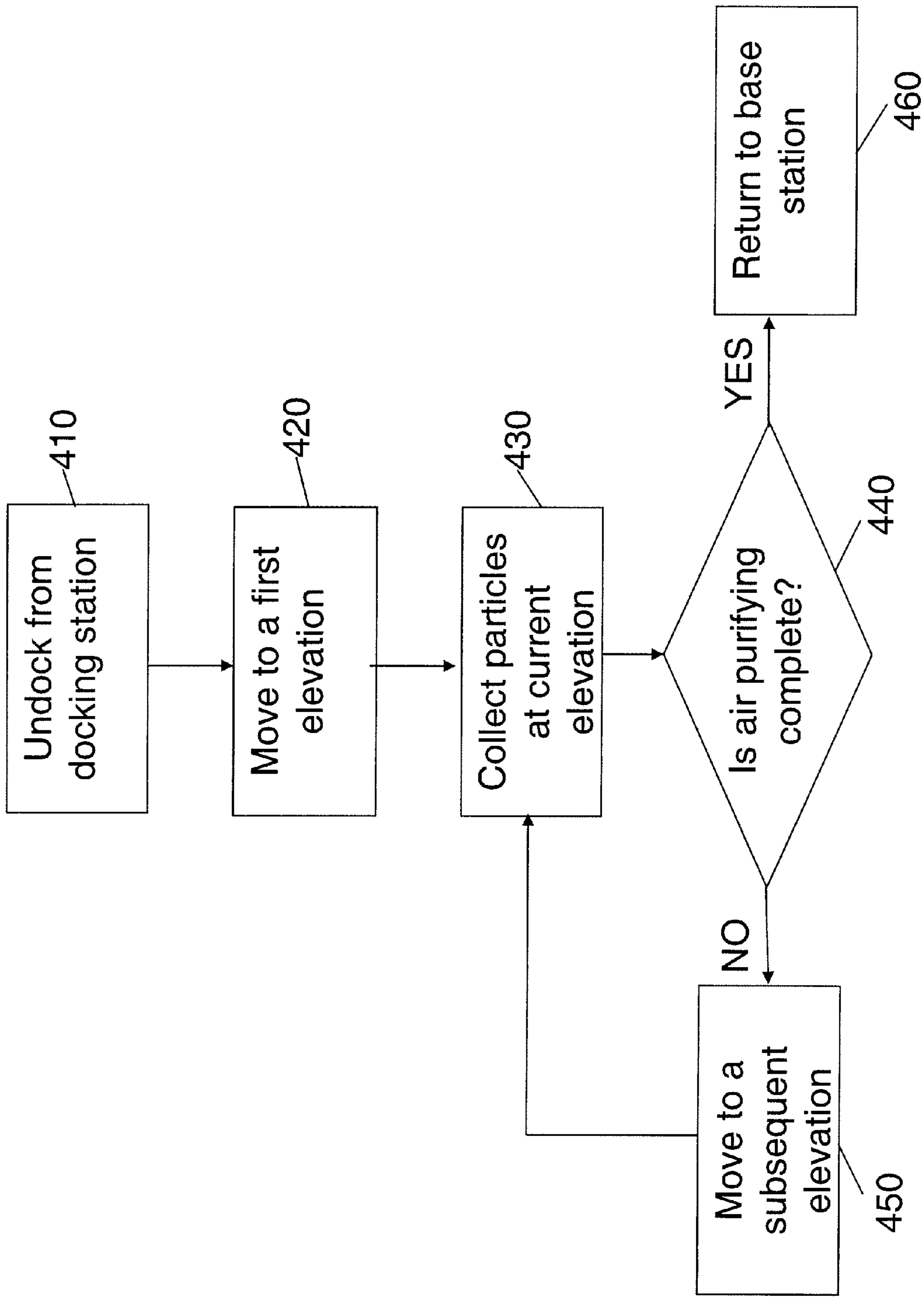
FIG. 4 is a flow diagram depicting operations performed in collecting particles using an illustrative air purifier.

FIG. 4 is a flow diagram depicting illustrative operations performed to collect particles using the flying air purifier 100. Additional, fewer, or different operations may be performed depending on the particular embodiment. In an operation 410, the flying air purifier 100 undocks from the base station 200. In an operation 420, the flying air purifier 100 moves to a first elevation in a space. The first elevation can be stored locally on the flying air purifier 100 or may also be received from the base station 200 via the antenna 128. The first elevation can be transmitted from the orbit calculation unit 220 via the antenna 222 to the flying air purifier 100. The orbit calculation unit 220 can transmit the first elevation when the flying air purifier 100 is docked at the base station 200 or anytime during flight. Alternatively, in another illustrative embodiment, the first elevation in space corresponds to an elevation that is near the ceiling of the space. In one embodiment, the sensor 150C can be used to determine when the flying air purifier is near the ceiling. In another embodiment, the base station 200 can determine the location of the flying air purifier 100 and, using a known height of the ceiling, transmit flight instructions to the flying air purifier 100 that the flying air purifier 100 has reached an elevation near the ceiling.

Upon moving to the first elevation, the flying air purifier 100 navigates through the space at the first elevation and removes particles from the air in an operation 430. In one embodiment, the flying air purifier 100 navigates a particular elevation in a circular pattern to ensure that air within the particular elevation is purified. Alternatively, non-circular patterns may be used. In an operation 440, a determination is made regarding whether the air purifying is complete. In one embodiment, the orbit calculation unit 220 determines if the air purifying is complete or whether the flying air purifier 100 should move to a second elevation. Flight instructions from the orbit calculation unit 220 can be transmitted using the antenna 222 of the base station 200. Alternatively, the flying air purifier 100 can determine when the air purifying is complete or when a move to the second elevation should occur. Examples of when the flying air purifier moves to the second elevation include, but are not limited to, when the air quality at the first elevation is above a threshold level, when the flying air purifier 100 has completely navigated the first elevation one or more times, or based upon an amount of time spent navigating the first elevation. The second elevation can be either above or below the first elevation. In one embodiment, an elevation above the first elevation can be achieved by articulating the propeller 106 and the side wings 110. In another embodiment, the air screw 140 can be used to navigate to an elevation above or below the current elevation. An elevation below the first elevation can also be achieved by articulating the propeller 106 and the side wings 110. Alternatively, the flying air purifier 100 may articulate the gas valve 126 allowing an amount of gas to escape, and thus, reduce the buoyancy of the flying air purifier 100. In yet another embodiment where the flying air purifier 100 is tethered, a winch can be used to move the flying air purifier 100 to an elevation above or below the current elevation.

In another illustrative embodiment, the operation 440 may also include the flying unit 102 sending a request to the orbit calculation unit 220 to determine if there is another elevation in the flight instructions. The orbit calculation unit 220 can respond with an indication of the next elevation, an amount of gas to discharge, an indication that there is a next elevation, flight instructions on how to move to the next elevation, or with an indication that there are no further elevations.

If there is a next elevation in the flight instructions, in an operation 450, the flying unit 102 moves to the next elevation. The flying unit 102 can descend to another elevation by discharging an amount of gas from the balloon 104 through the gas valve 126. The amount of gas discharged can be based upon information received from the orbit calculation unit 220 or determined by the flying unit 102. To ascend to another elevation, the flying unit 102 can use the propeller 106 and the pair of side wings 110 to navigate to a higher elevation. Once the flying air purifier 100 reaches the next elevation, the flying air purifier 100 navigates at the next elevation and removes particles from the air in an operation 430. If in the operation 440 the last elevation has been traversed, the flying unit 102 returns to the base station 200 as discussed in detail above, in an operation 460.

In one illustrative embodiment, the flying air purifier 100 moves to a first elevation that is near the ceiling of a space. After collecting particles at this elevation, the flying air purifier 100 descends about half the height (or diameter) of the air inlet 116. The flying air purifier 100 then collects particles at this elevation. The flying air purifier 110 continues to descend about half the height of the air inlet 116 until reaching the last elevation, at which time, the flying air purifier 110 can dock with the base station 200. Descending by about half the height of the air inlet 116 helps to maximize the amount of air/space that is purified. In an alternative embodiment, the flying air purifier 100 can start at the lowest elevation and incrementally move upward about one half the height (or diameter) of the air inlet 116 until it reaches the top elevation of the space. In another alternative embodiment, different distances for the upward/downward elevation adjustments may be used, such as the full height of the air inlet 116, six inches, 1 foot, 2 feet, etc.

Figure 5:
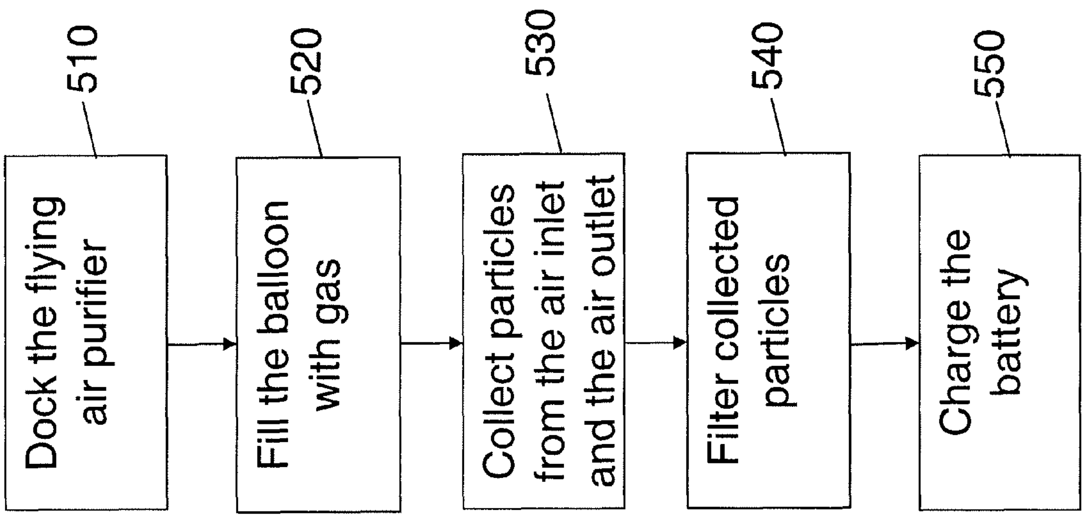
FIG. 5 is a flow diagram depicting operations performed in docking an illustrative air purifier.

FIG. 5 is a flow diagram depicting operations performed to dock the flying air purifier 100 in an illustrative embodiment. Additional, fewer, or different operations may be performed depending on the particular embodiment. In an operation 510, the flying air purifier 100 docks with the base station 200. As described above, in one embodiment, the flying air purifier 100 navigates into close range with the base station 200. Two or more magnets 242 and 244 attract the air inlet 116 and the air outlet 118 and properly align the flying air purifier 100 with the base station 200. The magnets 242 and 244 can also secure the flying air purifier 100 to the base station 200. In one embodiment, the orbit calculation unit 220 provides the flying air purifier 100 with instructions on how to navigate toward the base station 200 close enough such that the flying air purifier 100 docks. In a tethered embodiment, a winch reels in the flying air purifier 100 such that the flying air purifier 100 docks. Sensors and/or homing signals can also be used in conjunction with the camera unit 250 to dock the flying air purifier 100 as described above. In one embodiment, the flying air purifier 100 comes into contact with the docking table 262. As the flying air purifier 100 continues to dock, the docking table 262 can be depressed. Once fully depressed, the docking table 262 can provide an indication that the flying air purifier 100 is properly docked.

Once the flying air purifier 100 is docked, in an operation 520, the balloon 104 can be refilled with gas. In some steady state embodiments, a pressure gauge (not shown) can be used to measure the amount of gas within the balloon 104 to determine if gas should be added to the balloon 104. If the gas in the balloon 104 is sufficient to provide the flying air purifier 100 with enough buoyancy to put the flying air purifier 100 in a steady state, no gas may be added. If gas is to be added, the base station can provide the gas using the gas valve 214. In an operation 530, the captured particles are collected from the air inlet 116, the air outlet 118, and the grid 120. In one embodiment, the charges applied to the air inlet 116, the air outlet 118, and the grid 120 are reversed. Reversing the charges repels the collected particles away from the air inlet 116, air outlet 118, and the grid 120. In conjunction with the reversing of the charges, the suction motor 210 is turned on, suctioning the collected particles from the air inlet 116 and the air outlet 118 through the first exhaust valve 206 and the second exhaust valve 208, and the particles are collected. In an operation 540, the collected particles are filtered out of the air using the air filter 224 of the base station 200. The purified air can then be returned to the space using the exhaust port. In an operation 550, the recharge units 202 and/or 204 are engaged to charge the battery 124.

The flying air purifier 100 is not limited to moving to different elevations and/or areas using the methods described above. In an alternative embodiment, the flying unit 102 may include a hot air balloon that provides lift to the flying unit. The hot air balloon can include one or more heaters that can heat air or another gas contained within the hot air balloon. In such an embodiment, the flying unit 102 may include fuel and/or a power source for the heater. The heated gas within the hot air balloon can provide the buoyancy to move the flying air purifier 100 to different elevations. The hot air balloon can include controllable vents at the top of the hot air balloon. The vents can be opened to allow hot air to escape the hot air balloon. Releasing hot air from the hot air balloon can allow the flying air purifier 100 to descend to lower elevations. Instructions received from the base station can be used to control the heaters and/or vents of the hot air balloon. The combination of releasing air through the vents and heating the air within the hot air balloon allows the flying air purifier 100 to move up and down throughout the space. Flight instructions provided to the hot air balloon can be used to navigate the space in a similar manner as described above. The hot air balloon embodiment can also include one or more propellers or other thrust generating elements for controlling vertical and/or horizontal movement of the flying air purifier 100.

In another embodiment, the flying unit 102 can be implemented as a helicopter. In such an embodiment, the air purifier 114 can include one or more propellers or blades for controlling vertical and/or horizontal movement of the air purifier 114. The one or more propellers or blades can operate the same as propellers/blades of a helicopter as known to those of skill in the art. Flight instructions can be provided to the air purifier 114 to control the helicopter blades/propellers such that the air purifier 114 can be used to navigate a space in a similar mariner as described above.

One or more flow diagrams have been used herein. The use of flow diagrams is not meant to be limiting with respect to the order of operations performed. The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A flying air purifier comprising:

a flying unit configured to:

fly within a space at a first elevation; and fly within the space at a second elevation; and an air purifier mounted to the flying unit and configured to remove particles from air within the space at the first elevation and at the second elevation, wherein the air purifier includes:

an air inlet having a first charge;

an air outlet having a second charge, wherein the second charge is opposite of the first charge; and a detector configured to detect an air quality value, wherein the flying unit is further configured to move to the second elevation in response to detection by the air purifier that the air quality value of the first elevation is above a threshold value.

2. The flying air purifier of claim 1, wherein the flying unit is further configured to receive a signal, and wherein the signal instructs the flying unit to change from the first elevation to the second elevation.

3. The flying air purifier of claim 2, wherein the signal comprises a wireless signal that is received from a base station of the flying air purifier.

4. The flying air purifier of claim 1, wherein the first charge comprises a positive charge and the second charge comprises a negative charge.

5. The flying air purifier of claim 1, wherein the flying unit includes a balloon configured to contain a gas.

6. The flying air purifier of claim 5, wherein the gas includes helium.

7. The flying air purifier of claim 5, wherein the first elevation is higher than the second elevation, and wherein the flying unit is configured to move to the second elevation by discharge of an amount of the gas.

8. The flying air purifier of claim 1, further comprising a grid configured to cover the air outlet, wherein the grid has the second charge.

9. A method comprising:

flying a flying unit at a first elevation;

removing particles from air at the first elevation using an air purifier mounted to the flying unit, wherein the air purifier has an air inlet having a first charge and an air outlet having a second charge, and wherein the second charge is opposite of the first charge;

detecting an air quality value at the first elevation;

causing the flying unit to move from the first elevation to a second elevation in response to the detected air quality value of the first elevation being above a threshold value;

flying the flying unit at the second elevation; and removing particles from air at the second elevation using the air purifier.

10. The method of claim 9, wherein the flying unit includes a balloon filled with a gas, and wherein causing the flying unit to move to the second elevation comprises discharging an amount of the gas from the balloon.

11. The method of claim 10, wherein the first elevation is higher than the second elevation.

12. The method of claim 9, further comprising receiving a signal from a base station, wherein the signal instructs the flying unit to change from the first elevation to the second elevation.

13. The method of claim 9, further comprising:

docking the flying unit at a base station; and discharging collected particles at the base station.

14. The method of claim 13, wherein discharging the collected particles comprises applying a reverse bias to the air inlet and the air outlet of the air purifier.

15. The method of claim 13, further comprising:

refilling the flying unit with a gas at the base station;

releasing the flying unit from the base station; and flying the flying unit at the first elevation to collect additional particles from the air at the first elevation.

16. The method of claim 9, wherein removing particles from air at the first and second elevations include using the air inlet to collect particles having the second charge and using the air outlet to collect particles having the first charge.

17. A system comprising:

a flying unit configured to:

operate at a plurality of elevations within a space, including a first elevation and a second elevation; and adapt an elevation level in response to detecting an air quality value is above a threshold value, wherein the flying unit includes:

a balloon configured to contain a gas such that the flying unit is able to fly;

a first side wing and a second side wing mounted to opposite sides of the balloon; and a tail wing mounted to the balloon;

an air purifier mounted to the flying unit and comprising:

an air inlet having a first charge, wherein the air inlet is configured to collect particles having a second charge;

an air outlet having the second charge, wherein the air outlet is configured to collect particles having the first charge; and a detector configured to detect the air quality value, wherein the flying unit is further configured to move to a second elevation in response to detection by the air purifier that the air quality value of a first elevation is above a threshold value; and a base station configured to dock the flying unit.

18. The system of claim 17, further comprising an actuator configured to control the first side wing and the second side wing for adjustment of an elevation of the flying unit.

19. The system of claim 17, wherein the base station includes a recharge unit that is configured to charge a battery of the flying unit through contact with at least a portion of the air inlet and at least a portion of the air outlet.

20. The system of claim 17, wherein the base station includes a gas supply configured to provide the gas to the balloon when the flying unit is docked at the base station.

* * * * *